United States Patent
Nako et al.

(10) Patent No.: US 8,932,415 B2
(45) Date of Patent: Jan. 13, 2015

(54) WELDING METAL HAVING EXCELLENT LOW-TEMPERATURE TOUGHNESS AND DROP-WEIGHT CHARACTERISTICS

(75) Inventors: Hidenori Nako, Kobe (JP); Yoshitomi Okazaki, Kobe (JP); Ken Yamashita, Fujisawa (JP); Minoru Otsu, Fujisawa (JP); Hideaki Takauchi, Fujisawa (JP)

(73) Assignee: Kobe Steel, Ltd., Kobe-shi (JP)

( * ) Notice: Subject to any disclaimer, the term of this patent is extended or adjusted under 35 U.S.C. 154(b) by 165 days.

(21) Appl. No.: 13/574,672

(22) PCT Filed: Jan. 24, 2011

(86) PCT No.: PCT/JP2011/051228
§ 371 (c)(1),
(2), (4) Date: Jul. 23, 2012

(87) PCT Pub. No.: WO2011/093244
PCT Pub. Date: Aug. 4, 2011

(65) Prior Publication Data
US 2012/0294752 A1    Nov. 22, 2012

(30) Foreign Application Priority Data

Jan. 27, 2010 (JP) .................................. 2010-015835

(51) Int. Cl.
| | |
|---|---|
| C22C 38/22 | (2006.01) |
| C22C 38/24 | (2006.01) |
| C22C 38/26 | (2006.01) |
| C22C 38/28 | (2006.01) |
| B23K 35/30 | (2006.01) |

(52) U.S. Cl.
CPC .................................. B23K 35/3066 (2013.01)
USPC ........... 148/335; 148/336; 420/108; 420/109; 219/146.23

(58) Field of Classification Search
CPC ........ C22C 38/42; C22C 38/44; C22C 38/46; C22C 38/50; B23K 35/3086; B23K 35/3053; B23K 35/3066
USPC .................. 148/320, 333–332; 420/104–129; 219/146.1, 146.23
See application file for complete search history.

(56) References Cited

U.S. PATENT DOCUMENTS

| | | | |
|---|---|---|---|
| 4,436,554 A | 3/1984 | Omae et al. | |
| 5,744,782 A | 4/1998 | Sampath et al. | |
| 6,110,301 A | * 8/2000 | Singh et al. | ................... 148/336 |
| 8,043,407 B2 | 10/2011 | Nako et al. | |
| 8,124,247 B2 | 2/2012 | Hayakawa et al. | |
| 2005/0155960 A1 | 7/2005 | Bonnet | |
| 2010/0119861 A1 | 5/2010 | Hayakawa et al. | |
| 2012/0021246 A1 | 1/2012 | Nako et al. | |

FOREIGN PATENT DOCUMENTS

| | | |
|---|---|---|
| EP | 2 130 937 A1 | 12/2009 |
| JP | 4 313488 | 11/1992 |
| JP | 11 138293 | 5/1999 |
| JP | 11 192555 | 7/1999 |
| JP | 2001 113374 | 4/2001 |
| JP | 2001 335879 | 12/2001 |
| JP | 2004 315962 | 11/2004 |
| JP | 2006 257481 | 9/2006 |
| JP | 2008 240096 | 10/2008 |
| JP | 2009 101414 | 5/2009 |
| WO | WO 97/32684 A1 | 9/1997 |

OTHER PUBLICATIONS

Extended European Search Report issued May 13, 2013 in Patent Application No. 11736957.9.
International Search Report Issued Apr. 19, 2011 in PCT/JP11/51228 Filed Jan. 24, 2011.

* cited by examiner

Primary Examiner — Deborah Yee
(74) Attorney, Agent, or Firm — Oblon, Spivak, McClelland, Maier & Neustadt, L.L.P.

(57) ABSTRACT

Provided is a welding metal in which a predetermined chemical component composition is satisfied, the A value as specified by formula (1) is 3.8% to 9.0%, and the surface area percentage of carbide having a circle-equivalent diameter of 0.20 μm or greater in the welding metal is 4.0% or less.

$$A \text{ value} = 0.8 \times [C] - 0.05 \times [Si] + 0.5 \times [Mn] + 0.5 \times [Cu] + [Ni] - 0.5 \times [Mo] + 0.2 \times [Cr] \quad (1)$$

(Provided that [C], [Si], [Mn], [Cu], [Ni], [Mo] and [Cr] are the C, Si, Mn, Cu, Ni, Mo and Cr content (by mass percent), respectively)

The welding metal is useful as a material for a pressure vessel of a nuclear power plant as the welding metal is high in strength and has good low-temperature toughness and drop-weight characteristics.

5 Claims, No Drawings ized in containing C of 0.02% to 0.10% (by mass %, the same holds true for each chemical component composition described below); Si of 0.50% or less (excluding 0%); Mn of 1.0% to 1.9%; Ni of 2.7% to 8%; Cr of 0.8% or less (excluding 0%); Mo of 0.8% or less (excluding 0%); N of 0.010% or less (excluding 0%); and O of 0.010% or less (excluding 0%), wherein the total content of Cr and Mo is 0.10% to 1.2%, ... [page content too dense to fully reproduce — extracting primary technical content below]

WELDING METAL HAVING EXCELLENT LOW-TEMPERATURE TOUGHNESS AND DROP-WEIGHT CHARACTERISTICS

TECHNICAL FIELD

The present invention relates to a welding metal used for a Mn—Mo—Ni-series welded structure in a nuclear power field, and particularly relates to a welding metal having excellent low-temperature toughness and drop-weight characteristics.

BACKGROUND ART

Mn—Mo—Ni steel has been known to have excellent strength and toughness, and is mainly used as a material for, for example, a pressure vessel of a nuclear power plant. Such a material has been required to have a toughness level that is increasingly raised from the viewpoint of safety. For example, higher low-temperature toughness is required for a cask used for storage/transport of spent fuel from a nuclear power plant. In addition, higher drop-weight characteristics at low temperature are required for the cask to ensure safety against failure. In step with these, Mn—Mo—Ni-series welding metals used for such applications are also required to be improved in strength, low-temperature toughness, and drop-weight characteristics.

A welded structure including the Mn—Mo—Ni-series welding metal is subjected to long annealing for stress relief after welding (hereinafter, referred to as SR annealing), and carbide is precipitated during the SR annealing, causing variations in characteristics of the welding metal. Hence, there is a need of establishment of a technique for improving strength, low-temperature toughness, and drop-weight characteristics depending on conditions of SR annealing.

For example, Ni-based-alloy welding materials as disclosed in patent literature 1 and 9%—Ni-based-alloy welding materials as disclosed in patent literature 2 are known to be effective for improvement in low-temperature toughness of a welding metal. However, the Ni-based-alloy welding materials are disadvantageous in cost since the materials contain a large amount of expensive Ni. In addition, the 9%—Ni-based-alloy welding materials each have a stable austenite structure formed during SR annealing, causing a significant reduction in yield stress. Hence, there is a need of a technique that improves strength, low-temperature toughness, and drop-weight characteristics of the welding metal while controlling the Ni content at a low level.

On the other hand, for example, patent literature 3 discloses a certain effect of improving low-temperature toughness of a welding metal through formation of a fine acicular-ferrite structure nucleating on Ti-based oxide. In this technique, however, the lowest temperature at which sufficient low-temperature toughness is obtained is still not so low, −60° C. If a larger amount of Ti-based oxide is dispersed for further improvement in low-temperature toughness, coarse Ti oxide, which acts as origin of the fracture, increases. Hence, further devising is required. Patent literature 4 discloses a technique for achieving a welding metal having excellent drop-weight characteristics through controlling flux components and wire components in submerge arc welding. The submerge-arc welding metal, however, has a high oxygen level, leading to formation of coarse oxide. As a result, the lowest no-break performance temperature of the drop-weight characteristics is still not so low, −90° C. Furthermore, patent literature 5 discloses a welding metal having excellent fracture toughness through controlling the Ni content. However, the welding metal also has a high oxygen level, and therefore the low-temperature toughness of the welding metal is considered to be still insufficient.

On the other hand, while patent literature 6 proposes a technique of controlling the content of each of Nb and V of a TIG welding metal as an investigation on a TIG welding metal having a low oxygen content, the added Nb or V has adverse influence on a balance between strength and low-temperature toughness of the welding metal. Hence, the lowest temperature at which a sufficient toughness value is obtained is still not so low, −50° C. Consequently, there is a need of establishment of a novel technique of improving strength, low-temperature toughness, and drop-weight characteristics of the welding metal.

CITATION LIST

Patent Literature

[PTL 1] Japanese Unexamined Patent Application Publication No. H11-138293
[PTL 2] Japanese Unexamined Patent Application Publication No. 2009-101414
[PTL 3] Japanese Unexamined Patent Application Publication No. 2004-315962
[PTL 4] Japanese Unexamined Patent Application Publication No. H11-192555
[PTL 5] Japanese Unexamined Patent Application Publication No. 2001-335879
[PTL 6] Japanese Unexamined Patent Application Publication No. H4-313488

SUMMARY OF THE INVENTION

Problems that the Invention is to Solve

The present invention has been made in the view of such circumstances, and an object of the invention is to provide a welding metal that has high-strength, good low-temperature toughness, and good drop-weight characteristics so as to be useful as a material for a pressure vessel of a nuclear power plant.

Means for Solving the Problems

A welding metal according to the present invention, which solves the above-described problem, is summarized in containing C of 0.02% to 0.10% (by mass %, the same holds true for each chemical component composition described below); Si of 0.50% or less (excluding 0%); Mn of 1.0% to 1.9%; Ni of 2.7% to 8%; Cr of 0.8% or less (excluding 0%); Mo of 0.8% or less (excluding 0%); N of 0.010% or less (excluding 0%); and O of 0.010% or less (excluding 0%), wherein the total content of Cr and Mo is 0.10% to 1.2%, the remainder consists of iron and inevitable impurities, an A value as specified by the following formula (1) is 3.8% to 9.0%, and the surface area percentage of carbide having a circle-equivalent diameter of 0.20 µm or greater in the welding metal is 4.0% or less.

$$A \text{ value} = 0.8 \times [C] - 0.05 \times [Si] + 0.5 \times [Mn] + 0.5 \times [Cu] + [Ni] - 0.5 \times [Mo] + 0.2 \times [Cr], \quad (1)$$

where [C], [Si], [Mn], [Cu], [Ni], [Mo] and [Cr] are contents (by mass percent) of C, Si, Mn, Cu, Ni, Mo and Cr, respectively.

In the invention, the term "circle-equivalent diameter" means a diameter of a circle having the same area as that of a piece of carbide in order to indicate the size of the carbide in terms of the circle.

The welding metal according to the invention preferably has a B value as specified by the following formula (2) of 0.35% or less, thus leading to a further reduction in the surface area percentage of carbide and further improvement in low-temperature toughness and drop-weight characteristics:

$$B \text{ value} = [C] \times (2 \times [Mn] + 3 \times [Cr]), \tag{2}$$

where [C], [Mn], and [Cr] are contents (by mass percent) of C, Mn, and Cr, respectively.

The welding metal according to the invention usefully contains other elements such as (a) Ti of 0.040% or less (excluding 0%), (b) Al of 0.030% or less (excluding 0%), (c) Cu of 0.35% or less (excluding 0%), (d) Nb of 0.030% or less (excluding 0%) and/or V of 0.10% or less (excluding 0%) as necessary. This further improves the characteristics of the welding metal depending on types of the elements.

A welded structure having a welding metal having excellent low-temperature toughness and drop-weight characteristic can be achieved by including the welding metal as described above.

Advantage of the Invention

According to the invention, a chemical component composition of a welding metal is appropriately controlled while the relationship expressed by the formula (1) is satisfied, thus achieving a welding metal having high strength (tensile strength), good low-temperature toughness, and good drop-weight characteristics. Such a welding metal is useful as a material for a pressure vessel of a nuclear power plant, or a material for a cask.

MODE FOR CARRYING OUT THE INVENTION

The inventors have investigated means for achieving a welding metal ensuring excellent strength, low-temperature toughness, and drop-weight characteristics from a variety of angles. As a result, the inventors have found that while fine reheated-structures and coarse carbide are generally formed during welding, an increase in the fine reheated-structures and a decrease in the coarse carbide are effective for improving strength, low-temperature toughness, and drop-weight characteristics of a welding metal, and have achieved the present invention through devising a technique of accelerating formation of the reheated structures and fining the carbide.

The inventors have found that a chemical component composition of a welding metal is controlled to be within a predetermined range, an A value (formula (1)) described below obtained from the chemical components is controlled to be 3.8% to 9.0%, and the surface area percentage of carbide having a circle-equivalent diameter of 0.20 μm or greater in the welding metal is controlled to be 4.0% or less, thus achieving the welding metal having excellent strength, low-temperature toughness, and drop-weight characteristics. Furthermore, the inventors have found that a B value (formula (2)) described below, which is obtained from the chemical components as necessary, is controlled to be 0.35% or less, so that the surface area percentage of carbide can be further reduced, leading to further improvement in strength, low-temperature toughness, and drop-weight characteristics of the welding metal.

A welding material and a welding condition need to be appropriately controlled in order to achieve the welding metal of the invention. It will be appreciated that the components of the welding material are restricted by the components of the welding metal to be required. In addition, the welding condition and the welding material components need to be appropriately controlled in order to achieve the predetermined form of carbide. For example, in the case where welding heat input is 2.0 kJ/mm to 2.5 kJ/mm, and preheating/interpass temperature is 150° C. to 240° C., a β value expressed by the following formula (3) is preferably controlled to be 0.40% or less. This facilitates control of the surface area percentage of carbide having a circle-equivalent diameter of 0.20 μm or greater in the welding metal to be 4.0% or less.

$$\beta \text{ value} = [C] \times (1.5 \times [Mn] + 2.3 \times [Cr]), \tag{3}$$

where [C], [Mn], and [Cr] are contents (by mass percent) of C, Mn, and Cr, respectively.

The size of carbide is also affected by a structure of a welding metal matrix. Specifically, as the welding metal matrix is finer, carbide size is reduced due to an increase in the number of generation sites of carbide. Hence, if welding heat input is lower than the above range, or the preheating/interpass temperature decreases, cooling rate increases during welding, leading to a finer matrix structure. Consequently, the β value should be satisfied in a wider range. Conversely, if welding heat input increases, or the preheating/interpass temperature increases, the β value is preferably controlled to be within a narrower range. The welding heat input and the preheating/interpass temperature, which are parameters having influence on the characteristics such as strength of a welding metal, are each controlled to be within an appropriate range according to required characteristics.

While an SR annealing condition generally affects a form of the carbide, temperature and time during SR annealing should be controlled within a range of $17 \times 10^3$ to $19 \times 10^3$ in terms of Larson-Miller parameter (LMP) expressed by the following formula (4) for the form of the carbide in the welding metal of the invention.

$$LMP = (T + 273) \times (20 + \log t), \tag{4}$$

where T denotes SR annealing temperature (° C.), and t denotes SR annealing time (hours).

LMP of larger than $19 \times 10^3$ accelerates growth of carbide, thus preventing formation of carbide having a predetermined form. LMP of smaller than $17 \times 10^3$ extremely increases strength, and thus a welding metal cannot have good low-temperature toughness and drop-weight characteristics. For example, LMP is $17.3 \times 10^3$ for SR annealing at 565° C. for 4 hours, and LMP is $18.7 \times 10^3$ for SR annealing at 615° C. for 12 hours.

The welding metal of the invention is required to have a chemical component composition being appropriately controlled, and to satisfy the requirement for the A value, which is specified by the formula (1) with the content of each of elements C, Si, Mn, Cu, Ni, Mo and Cr, to be 3.8% to 9.0%.

$$A \text{ value} = 0.8 \times [C] - 0.05 \times [Si] + 0.5 \times [Mn] + 0.5 \times [Cu] + [Ni] - 0.5 \times [Mo] + 0.2 \times [Cr], \tag{1}$$

where [C], [Si], [Mn], [Cu], [Ni], [Mo] and [Cr] are contents (by mass percent) of C, Si, Mn, Cu, Ni, Mo and Cr, respectively.

While the formula (1) includes Cu that is contained as necessary, the A value can be calculated excluding the term of Cu for the welding metal without Cu, and can be calculated from the formula (1) for the welding metal containing Cu.

The A value is a parameter as an index of transition temperature of a welding metal. The transition temperature decreases with an increase in the A value. This in turn accelerates reverse transformation during welding, leading to an increase in the number of fine reheated-regions. An A value of smaller than 3.8% prevents the effect of the welding metal of the invention from being shown. An A value of larger than 9.0% causes formation of a fresh martensite structure through SR annealing, leading to a reduction in low-temperature toughness and in drop-weight characteristics. The lower limit of the A value is preferably 4.5%, and the upper limit thereof is preferably 8.0%.

The welding metal of the invention is required to have the surface area percentage of 4.0% or less of carbide having a circle-equivalent diameter of 0.20 μm or greater in the welding metal. If the surface area percentage is larger than 4.0%, coarse carbide is generated and accelerates development of cracks, leading to degradation in low-temperature toughness and in drop-weight characteristics. The surface area percentage is preferably 3.5% or less.

The B value as specified by the following formula (2) is a parameter indicating stability of the carbide. The B value is controlled to be 0.35% or less, so that generation of coarse carbide is suppressed, which preferably leads to further improvement in low-temperature toughness and drop-weight characteristics of the welding metal. The upper limit of the B value is more preferably 0.30%.

$$B \text{ value} = [C] \times (2 \times [Mn] + 3 \times [Cr]), \quad (2)$$

where [C], [Mn], and [Cr] are contents (by mass percent) of C, Mn, and Cr, respectively.

The basic component composition of the welding metal of the invention will now be described. Even if the welding metal of the invention has a chemical component composition having the A value as specified by the formula (1) within the predetermined range, the welding metal, of which the content of each component (element) is not within the appropriate range, cannot have excellent mechanical characteristics. Hence, the following is required for the welding metal of the invention: the A value (value of the formula (1)), which is specified with the appropriate content of each of elements C, Si, Mn, Cu, Ni, Mo and Cr, is controlled to be within the predetermined range, and furthermore the content of each chemical component is within the appropriate range as described below. The range of the content of each component is specified according to the following reason.

[C: 0.02% to 0.10%]

C is an essential element for the welding metal to have certain strength. In addition, C is an effective element for decreasing the transition temperature of the welding metal to increase the number of fine reheated-regions in order to improve low-temperature toughness and drop-weight characteristics of the welding metal. The C content must be 0.02% or more to effectively show such effects of C. An excessive C content, however, leads to coarsening of carbide, causing degradation in low-temperature toughness and drop-weight characteristics of the welding metal. Hence, the C content must be 0.10% or less. The lower limit of the C content is preferably 0.04% (more preferably 0.05%), and the upper limit thereof is preferably 0.08% (more preferably 0.07%).

[Si: 0.50% or Less (Excluding 0%)]

Si is an essential element for the welding metal to have certain strength. An excessive Si content, however, leads to an excessive increase in strength or an increase in a hard structure such as a martensite structure, causing degradation in low-temperature toughness and drop-weight characteristics of the welding metal. Hence, the Si content must be 0.50% or less. The lower limit of the Si content is preferably 0.05%, and the upper limit thereof is preferably 0.40% (more preferably 0.30%).

[Mn: 1.0% to 1.9%]

Mn is an essential element for the welding metal to have certain strength. In addition, Mn is effective for decreasing the transition temperature of the welding metal to increase the number of fine reheated-regions in order to improve low-temperature toughness and drop-weight characteristics of the welding metal. The Mn content must be 1.0% or more to effectively show such effects of Mn. The Mn content is preferably 1.2% or more (more preferably 1.3% or more). An excessive Mn content, however, leads to an excessive increase in strength and to coarsening of carbide, causing degradation in low-temperature toughness and drop-weight characteristics of the welding metal. Hence, the Mn content must be 1.9% or less. The Mn content is preferably 1.8% or less (more preferably 1.7% or less).

[Ni: 2.7% to 8%]

Ni is an effective element for decreasing the transition temperature of the welding metal to increase the number of fine reheated-regions in order to improve low-temperature toughness and drop-weight characteristics of the welding metal. The Ni content must be 2.7% or more to effectively show such effects of Ni. The Ni content is preferably 3.0% or more (more preferably 4.0% or more). An excessive Ni content, however, leads to formation of a fresh martensite structure during SR annealing, causing a reduction in low-temperature toughness and drop-weight characteristics of the welding metal. Hence, the Ni content must be 8% or less. The Ni content is preferably 7.0% or less (more preferably 6.0% or less).

[Cr: 0.8% or Less (Excluding 0%)]

Cr is an effective element for the welding metal to have certain strength. In addition, Cr decreases the transition temperature of the welding metal and thus increases the number of fine reheated-regions, leading to improvement in low-temperature toughness and drop-weight characteristics of the welding metal. An excessive Cr content, however, accelerates coarsening of carbide, causing degradation in low-temperature toughness and drop-weight characteristics of the welding metal. Hence, the Cr content must be 0.8% or less. The Cr content is preferably 0.6% or less (more preferably 0.5% or less). The lower limit of Cr content is preferably 0.1% (more preferably 0.2%) to effectively show the effects of Cr.

[Mo: 0.8% or Less (Excluding 0%)]

Mo is an effective element for improving strength of the welding metal through formation of fine carbide during SR annealing. An excessive Mo content, however, accelerates coarsening of carbide, causing a reduction in low-temperature toughness and drop-weight characteristics of the welding metal. Hence, the Mo content must be 0.8% or less. The Mo content is preferably 0.6% or less (more preferably 0.5% or less). The lower limit of Mo content is preferably 0.1% (more preferably 0.2%) to effectively show the effects of Mo.

[Cr+Mo: 0.10% to 1.2%]

Cr and Mo are each a carbide-forming element, and each improve strength of the welding metal through formation of fine carbide during SR annealing. The total content of Cr and Mo must be adjusted to be within an appropriate range to effectively show such an effect. If total content of Cr and Mo is less than 0.10%, the welding metal cannot have certain strength to be required. In contrast, an excessive total content of Cr and Mo of more than 1.2% leads to formation of a large amount of carbide, causing degradation in low-temperature toughness and drop-weight characteristics of the welding metal. The lower limit of the total content of Cr and Mo is preferably 0.15% (more preferably 0.2%), and the upper limit thereof is preferably 1.0% (more preferably 0.8%).

[N: 0.010% or Less (Excluding 0%)]

N is an effective element for improving strength of the welding metal through formation of nitride (or carbonitride) with each of elements including Ti, Nb, and V contained as necessary. An excessive N content, however, increases the amount of single nitrogen (dissolved nitrogen) instead of nitride, which impairs toughness of the welding metal. If the welding metal does not contain any of the elements Ti, Nb, and V, production of nitride (or carbonitride) decreases, so that dissolved nitrogen is readily generated. Hence, the N content must be 0.010% or less. The N content is preferably 0.0080% or less.

[O: 0.010% or Less (Excluding 0%)]

While O is a source of oxide, an excessive O content increases coarse oxide to be origin of the fracture, leading to a reduction in low-temperature toughness of the welding metal. Hence, the O content must be 0.010% or less. The O content is preferably 0.008% or less (more preferably 0.007% or less).

The component elements specified by the invention are as described above, and the remainder consists of iron and inevitable impurities. The inevitable impurities include elements such as P, S, B, Sn, Zr, Bi, and Pb, which are allowed to be mixed in depending on raw materials, other materials, and situations of production facilities. The welding metal of the invention usefully contains other elements such as (a) Ti of 0.040% or less (excluding 0%), (b) Al of 0.030% or less (excluding 0%), (c) Cu of 0.35% or less (excluding 0%), (d) Nb of 0.030% or less (excluding 0%), and/or V of 0.010% or less (excluding 0%) as necessary. This further improves the characteristics of the welding metal depending on types of the elements.

[Ti: 0.040% or Less (Excluding 0%)]

Ti is an effective element for improving strength of the welding metal after SR annealing through formation of carbide. An excessive Ti content, however, causes degradation in low-temperature toughness and drop-weight characteristics of the welding metal. Hence, the Ti content is preferably 0.40% or less. The Ti content is more preferably 0.035% or less (further preferably 0.03% or less). The lower limit of the Ti content is preferably 0.01% (more preferably 0.015%) to effectively show the effects of Ti.

[Al: 0.030% or Less (Excluding 0%)]

Although Al is an effective element as a deoxidizer, an excessive Al content, more than 0.030%, causes coarsening of oxide, which impairs low-temperature toughness of the welding metal. The Al content is more preferably 0.025% or less (further preferably 0.02% or less). The lower limit of the Al content is preferably 0.01% (more preferably 0.015%) to effectively show the effects of Al.

[Cu: 0.35% or Less (Excluding 0%)]

Cu is an effective element for improving strength of the welding metal. In addition, Cu decreases the transition temperature of the welding metal and thus increases the number of fine reheated-regions, leading to improvement in low-temperature toughness and drop-weight characteristics of the welding metal. An excessive Cu content, however, leads to an excessive increase in strength, which impairs low-temperature toughness and drop-weight characteristics of the welding metal. Hence, the Cu content is preferably 0.35% or less. The Cu content is more preferably 0.30% or less (further preferably 0.25% or less). The lower limit of the Cu content is preferably 0.02% (more preferably 0.05%) to effectively show the effects of Cu.

[Nb: 0.30% or Less (Excluding 0%) and/or V: 0.10% or Less (Excluding 0%)]

Nb and V are each an effective element for improving strength of the welding metal through formation of carbonitride. An excessive content of each element, however, causes degradation in low-temperature toughness and drop-weight characteristics of the welding metal. Hence, the Nb content is preferably 0.030% or less (more preferably 0.02% or less), and the V content is preferably 0.10% or less (more preferably 0.08% or less). To effectively show the effects of these elements, the lower limit of the Nb content is preferably 0.008% (more preferably 0.01%), and that of the V content is preferably 0.010% (more preferably 0.02%).

A welded structure having a welding metal having excellent low-temperature toughness and drop-weight characteristic can be achieved by including the above-described welding metal.

EXAMPLE

While the present invention will be described further in detail with an Example hereinafter, the Example is not intended to limit the invention, and appropriate alterations can be made within the scope without departing from the gist as described above and below, all of which are included in the technical scope of the present invention.

TIG welding was performed under the following welding condition using various types of welding wires having a diameter of 1.6 mm (W1 to W38 in the following Tables 1 and 2), each welding wire having a B value (the formula (3)), which was obtained from its composition (the content of each of C, Mn, and Cr), of 0.40% or less, 0.53 (W27), or 0.42 (W36). The chemical component composition of the Mn—Mo—Ni steel used in the TIG welding is as shown in Table 3 described below.

[TIG Welding Condition]
Base metal thickness: 20 mm;
Groove shape: V groove (angle: 20°);
Root gap: 16 mm;
Welding heat input: 2.3 kJ/mm (260 A-12 V, 8 cpm);
Shield gas: 100% Ar (inner; 25 L/min, outer; 30 L/min), where mixed gas of 0.1% $CO_2$+99.9% Ar or mixed gas of 0.2% $CO_2$+99.8% Ar was used in some examples;
Wire feed: 15 g/min;
Preheating/interpass temperature: 160° C. to 220° C.; and
Number of layers: 9 layers (18 passes).

TABLE 1

| Welding wire No. | Chemical component composition of welding wire* (percent by mass) | | | | | | | | | | | | |
|---|---|---|---|---|---|---|---|---|---|---|---|---|---|
| | C | Si | Mn | Ni | Cr | Mo | N | Ti | Al | Cu | Nb | V | β value |
| W1 | 0.09 | 0.35 | 1.73 | 3.4 | 0.68 | 0.46 | 0.0043 | — | — | — | — | — | 0.37 |
| W2 | 0.08 | 0.39 | 1.71 | 3.6 | 0.51 | 0.38 | 0.004 | — | — | — | — | — | 0.30 |
| W3 | 0.08 | 0.35 | 1.48 | 3.4 | 0.30 | 0.46 | 0.004 | — | — | — | — | — | 0.23 |
| W4 | 0.08 | 0.30 | 1.50 | 3.3 | 0.30 | 0.31 | 0.0039 | — | — | — | — | — | 0.24 |
| W5 | 0.06 | 0.19 | 1.45 | 4.3 | 0.30 | 0.32 | 0.0041 | — | — | — | — | — | 0.17 |

TABLE 1-continued

| Welding wire No. | Chemical component composition of welding wire* (percent by mass) | | | | | | | | | | | | β value |
|---|---|---|---|---|---|---|---|---|---|---|---|---|---|
| | C | Si | Mn | Ni | Cr | Mo | N | Ti | Al | Cu | Nb | V | |
| W6 | 0.08 | 0.17 | 1.75 | 3.8 | 0.31 | 0.30 | 0.004 | — | — | — | — | — | 0.27 |
| W7 | 0.08 | 0.17 | 1.48 | 4.4 | 0.31 | 0.32 | 0.0042 | — | — | — | — | — | 0.23 |
| W8 | 0.08 | 0.18 | 1.49 | 5.2 | 0.31 | 0.31 | 0.0038 | — | — | — | — | — | 0.24 |
| W9 | 0.05 | 0.32 | 1.45 | 3.5 | 0.30 | — | 0.0043 | — | — | — | — | — | 0.14 |
| W10 | 0.04 | 0.33 | 1.48 | 5.1 | 0.30 | — | 0.0041 | — | — | — | — | — | 0.12 |
| W11 | 0.08 | 0.18 | 1.65 | 5.3 | 0.35 | 0.13 | 0.004 | — | — | — | — | — | 0.26 |
| W12 | 0.06 | 0.18 | 1.50 | 5.4 | — | 0.25 | 0.0041 | — | — | — | — | — | 0.14 |
| W13 | 0.05 | 0.18 | 1.52 | 4.4 | — | 0.22 | 0.0045 | — | — | — | — | — | 0.11 |
| W14 | 0.08 | 0.17 | 1.50 | 4.3 | — | 0.21 | 0.0039 | — | — | — | — | — | 0.18 |
| W15 | 0.05 | 0.32 | 1.20 | 7.2 | 0.32 | — | 0.0043 | — | — | — | — | — | 0.13 |
| W16 | 0.05 | 0.47 | 1.30 | 4.3 | 0.53 | 0.15 | 0.0038 | 0.18 | — | 0.25 | — | — | 0.16 |
| W17 | 0.11 | 0.28 | 1.67 | 4.6 | 0.12 | 0.05 | 0.0041 | 0.18 | — | 0.25 | — | — | 0.31 |
| W18 | 0.08 | 0.19 | 1.48 | 4.1 | 0.32 | 0.29 | 0.0043 | 0.13 | 0.1 | 0.35 | — | — | 0.24 |
| W19 | 0.06 | 0.32 | 1.92 | 5.2 | 0.31 | — | 0.0036 | — | — | — | — | — | 0.22 |

*Remainder: iron and inevitable impurities

TABLE 2

| Welding wire No. | Chemical component composition of welding wire* (percent by mass) | | | | | | | | | | | | β value |
|---|---|---|---|---|---|---|---|---|---|---|---|---|---|
| | C | Si | Mn | Ni | Cr | Mo | N | Ti | Al | Cu | Nb | V | |
| W20 | 0.08 | 0.19 | 1.61 | 3.0 | 0.71 | — | 0.0040 | — | 0.05 | 0.015 | — | — | 0.32 |
| W21 | 0.06 | 0.30 | 1.48 | 7.7 | 0.08 | 0.15 | 0.0043 | — | 0.01 | — | — | — | 0.14 |
| W22 | 0.06 | 0.16 | 1.40 | 4.3 | 0.31 | 0.68 | 0.0041 | — | — | — | — | — | 0.17 |
| W23 | 0.06 | 0.16 | 1.47 | 4.3 | 0.3 | 0.30 | 0.0081 | — | — | 0.012 | — | — | 0.17 |
| W24 | 0.05 | 0.15 | 1.50 | 4.2 | 0.33 | 0.29 | 0.004 | — | — | 0.012 | — | — | 0.15 |
| W25 | 0.07 | 0.20 | 1.50 | 4.5 | 0.32 | 0.33 | 0.0041 | — | — | — | 0.02 | — | 0.21 |
| W26 | 0.07 | 0.19 | 1.51 | 4.4 | 0.33 | 0.31 | 0.0038 | — | — | — | — | 0.025 | 0.21 |
| W27 | 0.15 | 0.38 | 1.61 | 3.5 | 0.5 | 0.32 | 0.0043 | — | — | — | — | — | 0.53 |
| W28 | 0.08 | 0.17 | 0.91 | 3.8 | 0.28 | 0.31 | 0.0051 | — | — | — | — | — | 0.16 |
| W29 | 0.05 | 0.61 | 1.55 | 2.1 | 0.48 | 0.32 | 0.0046 | 0.20 | — | — | — | — | 0.17 |
| W30 | 0.08 | 0.19 | 1.48 | 4.3 | 0.91 | 0.31 | 0.0046 | — | 0.12 | — | — | — | 0.35 |
| W31 | 0.05 | 0.15 | 1.42 | 4.3 | 0.18 | 0.93 | 0.0050 | — | — | 0.38 | — | — | 0.13 |
| W32 | 0.08 | 0.18 | 1.46 | 3.3 | — | 0.08 | 0.0042 | — | — | — | — | — | 0.18 |
| W33 | 0.05 | 0.19 | 1.48 | 4.2 | 0.65 | 0.72 | 0.0039 | — | — | — | — | — | 0.19 |
| W34 | 0.08 | 0.25 | 1.81 | 3.6 | 0.32 | 0.24 | 0.0124 | — | — | — | — | — | 0.28 |
| W35 | 0.05 | 0.36 | 1.53 | 3.7 | 0.36 | 0.22 | 0.0049 | — | — | — | — | — | 0.16 |
| W36 | 0.1 | 0.18 | 1.88 | 4.1 | 0.58 | 0.26 | 0.0041 | — | — | — | — | — | 0.42 |
| W37 | 0.08 | 0.33 | 1.70 | 3.1 | 0.33 | 0.54 | 0.0048 | — | — | — | — | — | 0.26 |
| W38 | 0.08 | 0.31 | 1.80 | 8.0 | 0.56 | — | 0.0052 | — | — | 0.29 | — | — | 0.32 |

*Remainder: iron and inevitable impurities

TABLE 3

Chemical component composition of base metal* (percent by mass)

| C | Si | Mn | P | S | Cu | Al | Ni | Cr | Mo | V | Ti | Nb |
|---|---|---|---|---|---|---|---|---|---|---|---|---|
| 0.1 | 0.21 | 1.33 | 0.008 | 0.003 | 0.03 | 0.028 | 0.55 | 0.09 | 0.47 | 0.005 | 0.004 | 0.005 |

*Remainder: iron and inevitable impurities

The chemical component composition of each of the resultant welding metals is shown in the following Tables 4 and 5 together with the A value, the B value, and a type of the shield gas during welding.

TABLE 4

| Experiment No. | Welding wire No. | Chemical component composition of welding metal* (percent by mass) | | | | | | | | | | | | | A value (%) | B value (%) | Shield gas (inner) |
|---|---|---|---|---|---|---|---|---|---|---|---|---|---|---|---|---|---|
| | | C | Si | Mn | Ni | Cr | Mo | Cr + Mo | N | O | Ti | Al | Cu | Nb | V | | | |
| 1 | W1 | 0.08 | 0.34 | 1.66 | 3.3 | 0.65 | 0.45 | 1.10 | 0.0045 | 0.0021 | — | — | — | — | — | 4.1 | 0.42 | Ar |
| 2 | W2 | 0.06 | 0.38 | 1.64 | 3.5 | 0.49 | 0.38 | 0.87 | 0.0046 | 0.0023 | — | — | — | — | — | 4.3 | 0.29 | Ar |
| 3 | W3 | 0.06 | 0.34 | 1.45 | 3.4 | 0.29 | 0.45 | 0.74 | 0.0047 | 0.0033 | — | — | — | — | — | 4.0 | 0.23 | Ar |
| 4 | W4 | 0.06 | 0.29 | 1.46 | 3.2 | 0.29 | 0.31 | 0.60 | 0.0047 | 0.0026 | — | — | — | — | — | 3.9 | 0.23 | Ar |

TABLE 4-continued

| Experiment No. | Welding wire No. | Chemical component composition of welding metal* (percent by mass) | | | | | | | | | | | | | A value (%) | B value (%) | Shield gas (inner) |
|---|---|---|---|---|---|---|---|---|---|---|---|---|---|---|---|---|---|
| | | C | Si | Mn | Ni | Cr | Mo | Cr + Mo | N | O | Ti | Al | Cu | Nb | V | | | |
| 5 | W5 | 0.04 | 0.17 | 1.42 | 4.2 | 0.29 | 0.31 | 0.60 | 0.0045 | 0.0024 | — | — | — | — | — | 4.8 | 0.15 | Ar |
| 6 | W6 | 0.06 | 0.16 | 1.71 | 3.7 | 0.30 | 0.3 | 0.60 | 0.0047 | 0.0033 | — | — | — | — | — | 4.5 | 0.26 | Ar |
| 7 | W7 | 0.06 | 0.17 | 1.43 | 4.2 | 0.29 | 0.31 | 0.60 | 0.0047 | 0.0028 | — | — | — | — | — | 4.9 | 0.22 | Ar |
| 8 | W8 | 0.06 | 0.17 | 1.44 | 5.1 | 0.29 | 0.30 | 0.59 | 0.0042 | 0.0028 | — | — | — | — | — | 5.8 | 0.23 | Ar |
| 9 | W9 | 0.04 | 0.31 | 1.44 | 3.4 | 0.29 | 0.02 | 0.31 | 0.0051 | 0.0031 | — | — | — | — | — | 4.2 | 0.15 | Ar |
| 10 | W10 | 0.03 | 0.31 | 1.44 | 4.9 | 0.28 | 0.03 | 0.31 | 0.0048 | 0.0034 | — | — | — | — | — | 5.7 | 0.11 | Ar |
| 11 | W11 | 0.06 | 0.16 | 1.58 | 5.0 | 0.33 | 0.12 | 0.45 | 0.0044 | 0.0027 | — | — | — | — | — | 5.8 | 0.25 | Ar |
| 12 | W12 | 0.04 | 0.15 | 1.46 | 5.3 | 0.02 | 0.22 | 0.24 | 0.0045 | 0.0028 | — | — | — | — | — | 5.9 | 0.12 | Ar |
| 13 | W13 | 0.04 | 0.15 | 1.48 | 4.3 | 0.02 | 0.20 | 0.22 | 0.0047 | 0.0025 | — | — | — | — | — | 5.0 | 0.12 | Ar |
| 14 | W14 | 0.06 | 0.16 | 1.44 | 4.2 | 0.02 | 0.20 | 0.22 | 0.0048 | 0.0026 | — | — | — | — | — | 4.9 | 0.18 | Ar |
| 15 | W15 | 0.03 | 0.30 | 1.18 | 6.8 | 0.30 | 0.03 | 0.33 | 0.0048 | 0.0036 | — | — | — | — | — | 7.4 | 0.10 | Ar |
| 16 | W16 | 0.04 | 0.44 | 1.28 | 4.2 | 0.51 | 0.13 | 0.64 | 0.0048 | 0.0029 | 0.034 | — | 0.24 | — | — | 5.0 | 0.16 | Ar |
| 17 | W17 | 0.09 | 0.26 | 1.66 | 4.5 | 0.09 | 0.03 | 0.12 | 0.0051 | 0.0018 | 0.038 | — | 0.25 | — | — | 5.5 | 0.32 | Ar |
| 18 | W18 | 0.06 | 0.18 | 1.45 | 4.0 | 0.31 | 0.27 | 0.58 | 0.005 | 0.0029 | 0.022 | 0.027 | 0.33 | — | — | 4.9 | 0.23 | Ar |
| 19 | W19 | 0.04 | 0.31 | 1.88 | 5.1 | 0.30 | 0.02 | 0.32 | 0.0044 | 0.0018 | — | — | — | — | — | 6.1 | 0.19 | Ar |

*Remainder: iron and inevitable impurities

TABLE 5

| Experiment No. | Welding wire No. | Chemical component composition of welding metal* (percent by mass) | | | | | | | | | | | | | A value (%) | B value (%) | Shield gas (inner) |
|---|---|---|---|---|---|---|---|---|---|---|---|---|---|---|---|---|---|
| | | C | Si | Mn | Ni | Cr | Mo | Cr + Mo | N | O | Ti | Al | Cu | Nb | V | | | |
| 20 | W20 | 0.06 | 0.18 | 1.58 | 2.9 | 0.68 | 0.02 | 0.70 | 0.0048 | 0.003 | — | 0.013 | 0.011 | — | — | 3.9 | 0.31 | Ar |
| 21 | W21 | 0.04 | 0.25 | 1.45 | 7.5 | 0.05 | 0.13 | 0.18 | 0.0047 | 0.0024 | — | 0.008 | — | — | — | 8.2 | 0.12 | Ar |
| 22 | W22 | 0.04 | 0.15 | 1.37 | 4.2 | 0.29 | 0.65 | 0.94 | 0.0048 | 0.0029 | — | — | — | — | — | 4.6 | 0.14 | Ar |
| 23 | W23 | 0.05 | 0.15 | 1.45 | 4.2 | 0.30 | 0.28 | 0.58 | 0.0083 | 0.0026 | — | — | 0.010 | — | — | 4.9 | 0.19 | Ar |
| 24 | W24 | 0.02 | 0.14 | 1.48 | 4.1 | 0.32 | 0.27 | 0.59 | 0.0045 | 0.0085 | — | — | 0.010 | — | — | 4.8 | 0.08 | 0.1% $CO_2$ + Ar |
| 25 | W25 | 0.05 | 0.18 | 1.44 | 4.3 | 0.29 | 0.31 | 0.60 | 0.0056 | 0.0033 | — | — | — | 0.013 | — | 5.0 | 0.19 | Ar |
| 26 | W26 | 0.05 | 0.17 | 1.48 | 4.3 | 0.32 | 0.31 | 0.63 | 0.0049 | 0.0028 | — | — | — | — | 0.02 | 5.0 | 0.20 | Ar |
| 27 | W27 | 0.12 | 0.35 | 1.58 | 3.4 | 0.48 | 0.31 | 0.79 | 0.0041 | 0.0015 | — | — | — | — | — | 4.2 | 0.55 | Ar |
| 28 | W28 | 0.06 | 0.16 | 0.89 | 3.8 | 0.28 | 0.30 | 0.58 | 0.0049 | 0.0021 | — | — | — | — | — | 4.2 | 0.16 | Ar |
| 29 | W29 | 0.02 | 0.53 | 1.53 | 2.1 | 0.45 | 0.31 | 0.76 | 0.0050 | 0.0086 | 0.042 | — | — | — | — | 2.7 | 0.09 | 0.1% $CO_2$ + Ar |
| 30 | W30 | 0.06 | 0.18 | 1.45 | 4.2 | 0.88 | 0.30 | 1.18 | 0.0046 | 0.0021 | — | 0.032 | — | — | — | 5.0 | 0.33 | Ar |
| 31 | W31 | 0.04 | 0.15 | 1.40 | 4.3 | 0.16 | 0.85 | 1.01 | 0.0048 | 0.0031 | — | — | 0.36 | — | — | 4.8 | 0.13 | Ar |
| 32 | W32 | 0.06 | 0.16 | 1.43 | 3.1 | 0.02 | 0.05 | 0.07 | 0.0053 | 0.0029 | — | — | — | — | — | 3.8 | 0.18 | Ar |
| 33 | W33 | 0.04 | 0.18 | 1.45 | 4.1 | 0.61 | 0.70 | 1.31 | 0.0046 | 0.0028 | — | — | — | — | — | 4.6 | 0.19 | Ar |
| 34 | W34 | 0.06 | 0.24 | 1.78 | 3.6 | 0.31 | 0.24 | 0.55 | 0.0106 | 0.0024 | — | — | — | — | — | 4.5 | 0.27 | Ar |
| 35 | W35 | 0.02 | 0.35 | 1.51 | 3.6 | 0.35 | 0.21 | 0.56 | 0.0051 | 0.0110 | — | — | — | — | — | 4.3 | 0.08 | 0.2% $CO_2$ + Ar |
| 36 | W36 | 0.08 | 0.16 | 1.80 | 4.1 | 0.55 | 0.25 | 0.80 | 0.0045 | 0.0024 | — | — | — | — | — | 5.0 | 0.42 | Ar |
| 37 | W37 | 0.06 | 0.31 | 1.68 | 3.0 | 0.31 | 0.51 | 0.82 | 0.0048 | 0.0027 | — | — | — | — | — | 3.7 | 0.26 | Ar |
| 38 | W38 | 0.06 | 0.30 | 1.78 | 7.9 | 0.55 | 0.02 | 0.57 | 0.0043 | 0.0022 | — | — | 0.28 | — | — | 9.1 | 0.31 | Ar |

*Remainder: iron and inevitable impurities

Each of the resultant welding metals was subjected to SR annealing under a condition of 565° C.×4 hours (LMP=17.3× $10^3$) or 615° C.×12 hours (LMP=18.7×$10^3$), and then subjected to measurement of the surface area percentage (total area percentage) of carbide having a circle-equivalent diameter of 0.20 µm or greater according to the following procedure, and subjected to evaluation of each of tensile strength (TS), low-temperature toughness ($vE_{-74}$), and drop-weight characteristics under the following conditions.

[Measurement of Surface Area Percentage of Carbide]

Test pieces for replica TEM (Transmission Electron Microscope) observation were sampled from the center of the final pass of each welding metal subjected to the SR annealing.

TEM images were photographed at 7500-fold magnification in four optional fields for each of the test pieces, and each piece of carbide having a circle-equivalent diameter of 0.20 µm or greater was selected, and the surface area percentage of the carbide was calculated through image analysis using image analysis software (Image-Pro Plus manufactured by Media Cybernetics).

[Tensile Strength of Welding Metal]

Tensile test pieces (test pieces according to JIS Z3111 A2) were sampled from the center of each welding metal subjected to the SR annealing in a direction of the welding line, and were each subjected to a tensile test according to the procedure of JIS Z2241 for measurement of tensile strength (TS). Any sample having the tensile strength TS of more than 620 MPa was determined to be acceptable.

[Evaluation of Low-Temperature Toughness of Welding Metal]

Charpy impact test pieces (test pieces according to JIS Z 31114 (V-notch test pieces)) were sampled from the center of each welding metal subjected to the SR annealing in a direction of the welding line for the Charpy impact test performed three times at −74° C. according to JIS Z 2242 for each welding metal, and the average of absorbed energy at −74° C.

($vE_{-74}$) was determined for each welding metal. Any sample having the absorbed energy ($vE_{-74}$) more than 70 J was determined to be excellent in low-temperature toughness.

[Evaluation of Drop-Weight Characteristics]

P-3 test pieces were each sampled from the center of each welding metal, and used for a drop weight test at −160° F. (−107° C.) according to ASTM E208 (2006). Any unbroken sample was determined to be excellent in drop-weight characteristics ("○").

These measurement results (the surface area percentage of carbide, the tensile strength, the drop-weight characteristics, and the low-temperature toughness ($vE_{-74}$)) are shown in the following Tables 6 and 7 for each of the SR annealing conditions.

TABLE 6

| Experiment No. | Welding wire No. | SR annealing condition (565° C. × 4 hr) | | | | SR annealing condition (615° C. × 12 hr) | | | |
|---|---|---|---|---|---|---|---|---|---|
| | | Surface area percentage of carbide (%) | TS (MPa) | Drop-weight characteristics | $vE_{-74}$ (J) | Surface area percentage of carbide (%) | TS (MPa) | Drop-weight characteristics | $vE_{-74}$ (J) |
| 1 | W1 | 3.8 | 841 | ○ | 74 | 3.7 | 823 | ○ | 81 |
| 2 | W2 | 2.8 | 824 | ○ | 100 | 2.6 | 778 | ○ | 120 |
| 3 | W3 | 2.4 | 789 | ○ | 115 | 2.3 | 763 | ○ | 120 |
| 4 | W4 | 2.4 | 766 | ○ | 128 | 2.4 | 738 | ○ | 141 |
| 5 | W5 | 1.8 | 751 | ○ | 131 | 1.7 | 741 | ○ | 148 |
| 6 | W6 | 2.8 | 786 | ○ | 139 | 2.6 | 755 | ○ | 128 |
| 7 | W7 | 2.4 | 783 | ○ | 121 | 2.3 | 760 | ○ | 132 |
| 8 | W8 | 2.5 | 803 | ○ | 119 | 2.2 | 765 | ○ | 141 |
| 9 | W9 | 1.8 | 631 | ○ | 214 | 2.0 | 622 | ○ | 240 |
| 10 | W10 | 1.5 | 636 | ○ | 215 | 1.8 | 629 | ○ | 241 |
| 11 | W11 | 2.9 | 763 | ○ | 133 | 3.0 | 744 | ○ | 150 |
| 12 | W12 | 1.3 | 731 | ○ | 175 | 1.2 | 708 | ○ | 201 |
| 13 | W13 | 1.3 | 684 | ○ | 186 | 1.3 | 669 | ○ | 205 |
| 14 | W14 | 2.0 | 721 | ○ | 161 | 1.8 | 703 | ○ | 195 |
| 15 | W15 | 1.3 | 651 | ○ | 220 | 1.5 | 640 | ○ | 237 |
| 16 | W16 | 2.0 | 781 | ○ | 91 | 2.0 | 765 | ○ | 93 |
| 17 | W17 | 3.4 | 795 | ○ | 78 | 3.5 | 763 | ○ | 72 |
| 18 | W18 | 2.6 | 815 | ○ | 81 | 2.4 | 780 | ○ | 95 |
| 19 | W19 | 1.9 | 768 | ○ | 127 | 2.1 | 688 | ○ | 186 |

TABLE 7

| Experiment No. | Welding wire No. | SR annealing condition (565° C. × 4 hr) | | | | SR annealing condition (615° C. × 12 hr) | | | |
|---|---|---|---|---|---|---|---|---|---|
| | | Surface area percentage of carbide (%) | TS (MPa) | Drop-weight characteristics | $vE_{-74}$ (J) | Surface area percentage of carbide (%) | TS (MPa) | Drop-weight characteristics | $vE_{-74}$ (J) |
| 20 | W20 | 3.3 | 811 | ○ | 96 | 3.6 | 758 | ○ | 81 |
| 21 | W21 | 1.6 | 761 | ○ | 197 | 1.5 | 730 | ○ | 110 |
| 22 | W22 | 1.7 | 761 | ○ | 121 | 1.3 | 753 | ○ | 131 |
| 23 | W23 | 1.8 | 753 | ○ | 80 | 1.7 | 720 | ○ | 93 |
| 24 | W24 | 1.0 | 683 | ○ | 123 | 1.1 | 645 | ○ | 156 |
| 25 | W25 | 1.8 | 787 | ○ | 92 | 1.7 | 816 | ○ | 73 |
| 26 | W26 | 2.3 | 768 | ○ | 125 | 2.1 | 806 | ○ | 105 |
| 27 | W27 | 4.6 | 860 | X | 41 | 4.8 | 844 | X | 61 |
| 28 | W28 | 1.3 | 611 | ○ | 248 | 1.2 | 604 | ○ | 254 |
| 29 | W29 | 1.1 | 748 | X | 53 | 1.2 | 719 | X | 56 |
| 30 | W30 | 3.4 | 831 | X | 46 | 3.8 | 823 | X | 38 |
| 31 | W31 | 1.5 | 806 | X | 51 | 0.9 | 764 | X | 41 |
| 32 | W32 | 1.5 | 612 | ○ | 224 | 1.6 | 598 | ○ | 250 |
| 33 | W33 | 1.6 | 836 | X | 66 | 1.2 | 816 | X | 63 |
| 34 | W34 | 2.2 | 725 | X | 60 | 2.4 | 688 | X | 59 |
| 35 | W35 | 0.8 | 649 | X | 48 | 0.6 | 646 | ○ | 54 |
| 36 | W36 | 4.1 | 806 | X | 60 | 4.2 | 771 | X | 55 |
| 37 | W37 | 2.6 | 779 | X | 96 | 2.4 | 778 | X | 102 |
| 38 | W38 | 3.1 | 770 | X | 46 | 3.5 | 720 | X | 43 |

The following consideration is derived from these results (in the following description, "No." indicates each experiment number in Tables 6 and 7). Nos. 1 to 26 are examples satisfying the requirements specified by the invention, in each of which a chemical component composition and the A value are appropriately controlled, thus providing a welding metal having excellent strength, low-temperature toughness, and drop-weight characteristics.

In contrast, Nos. 27 to 38 are examples in each of which at least one of the requirements specified by the invention is not satisfied, and at least one characteristic is inferior.

Among them, No. 27 is an example where the C content exceeds the range specified by the invention (the surface area percentage of carbide, or the B value, is high), and therefore the low-temperature toughness and the drop-weight characteristics are degraded though the strength is high. No. 28 is an example where the Mn content is lower than the range specified by the invention, and therefore the required strength is not obtained.

No. 29 is an example where the Si content exceeds the range specified by the invention (the content of Ti as an optional component is also excessive), and the Ni content is lower than the range specified by the invention (the A value is low), and therefore both the low-temperature toughness and the drop-weight characteristics are degraded though the strength is high. No. 30 is an example where the Cr content exceeds the range specified by the invention (the content of Al as an optional component is also excessive), and therefore both the low-temperature toughness and the drop-weight characteristics are degraded though the strength is high.

No. 31 is an example where the Mo content exceeds the range specified by the invention (the content of Cu as an optional component is also excessive), and therefore the low-temperature toughness and the drop-weight characteristics are degraded though the strength is high. No. 32 is an example where the total content of Cr and Mo is lower than the range specified by the invention, and therefore the required strength is not obtained.

No. 33 is an example where the total content of Cr and Mo exceeds the range specified by the invention, and therefore the low-temperature toughness and the drop-weight characteristics are degraded though the strength is high. No. 34 is an example where the N content exceeds the range specified by the invention, and therefore the low-temperature toughness and the drop-weight characteristics are degraded though the strength is high.

No. 35 is an example where the O content exceeds the range specified by the invention, and therefore the low-temperature toughness and the drop-weight characteristics after SR annealing under a condition of $LMP=17.3 \times 10^3$ are degraded though the strength is high. No. 36 is an example where the B value as a preferable requirement is high (the surface area percentage of carbide is high), and therefore the low-temperature toughness and the drop-weight characteristics are degraded though the strength is high.

No. 37 is an example where the A value is lower than the range specified by the invention, and therefore the drop-weight characteristics are degraded. No. 38 is an example where the A value exceeds the range specified by the invention, and therefore the drop-weight characteristics are degraded.

Although the present invention has been described in detail with reference to the particular embodiment, it will be appreciated for those skilled in the art that various alterations and modifications of the embodiment can be made within the scope without departing from the spirit and the scope of the invention.

This application is based on Japanese Unexamined Patent Application filed on Jan. 27, 2010 (Japanese Unexamined Patent Application Publication No. 2010-015835), all the content of which is incorporated herein by reference.

INDUSTRIAL APPLICABILITY

The welding metal of the present invention has high strength, good low-temperature toughness, and good drop-weight characteristics, and therefore is useful as a material for a pressure vessel of a nuclear power plant.

The invention claimed is:

1. A welding metal, comprising:
    C of 0.02% to 0.10%;
    Si of greater than 0% to 0.50%;
    Mn of 1.0% to 1.9%;
    Ni of 2.7% to 8%;
    Cr of greater than 0% to 0.8%;
    Mo of greater than 0% to 0.8%;
    N of greater than 0% to 0.010%; and
    O of greater than 0% to 0.010%,
  in mass percent,
    wherein:
    a total content of Cr and Mo is from 0.10% to 1.2%;
    the welding metal further comprises iron and inevitable impurities;
    a surface area percentage of carbide having a circle-equivalent diameter of 0.20 μm or greater in the welding metal after a stress relief (SR) annealing is 4.0% or less; and
    an A value as specified by the formula (1) is from 3.8% to 6.1:

$A$ value=0.8×[C]−0.05×[Si]+0.5×[Mn]+0.5×[Cu]+ [Ni]−0.5×[Mo]+0.2×[Cr]     (1), wherein [C], [Si], [Mn], [Cu], [Ni], [Mo], and [Cr] are contents, in mass percent, of C, Si, Mn, Cu, Ni, Mo, and Cr, respectively.

2. The welding metal of claim 1, wherein a B value as specified by the formula (2) is 0.35% or less:

$B$ value=[C]×(2×[Mn]+3×[Cr]),     (2), wherein [C], [Mn], and [Cr] are contents, in mass percent, of C, Mn, and Cr, respectively.

3. The welding metal of claim 1, further comprising at least one element selected from the group consisting of:
    Ti of greater than 0% to 0.040%;
    Al of greater than 0% to 0.030%;
    Cu of greater than 0% to 0.35%; and
    at least one selected from a group consisting of:
      Nb of greater than 0% to 0.030%; and
      V of greater than 0% to 0.10%.

4. A welded structure, comprising the welding metal of claim 1.

5. The welding metal of claim 2, further comprising at least one element selected from the group consisting of:
    Ti of greater than 0% to 0.040%;
    Al of greater than 0% to 0.030%;
    Cu of greater than 0% to 0.35%; and
    at least one selected from a group consisting of:
      Nb of greater than 0% to 0.030%; and
      V of greater than 0% to 0.10%.

* * * * *